(No Model.)
C. E. MACARTHY.
CAR COUPLING.
No. 263,549. Patented Aug. 29, 1882.
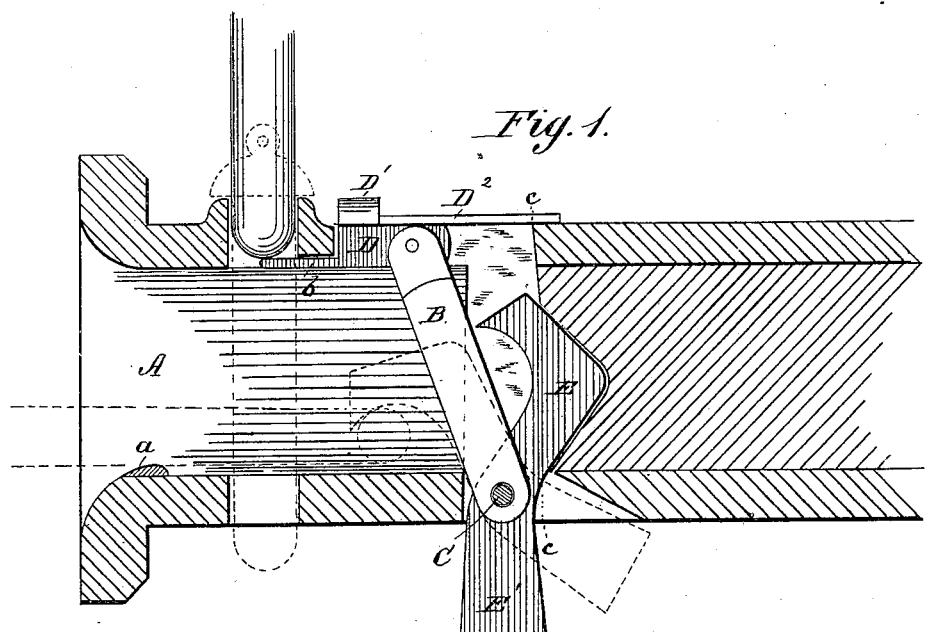
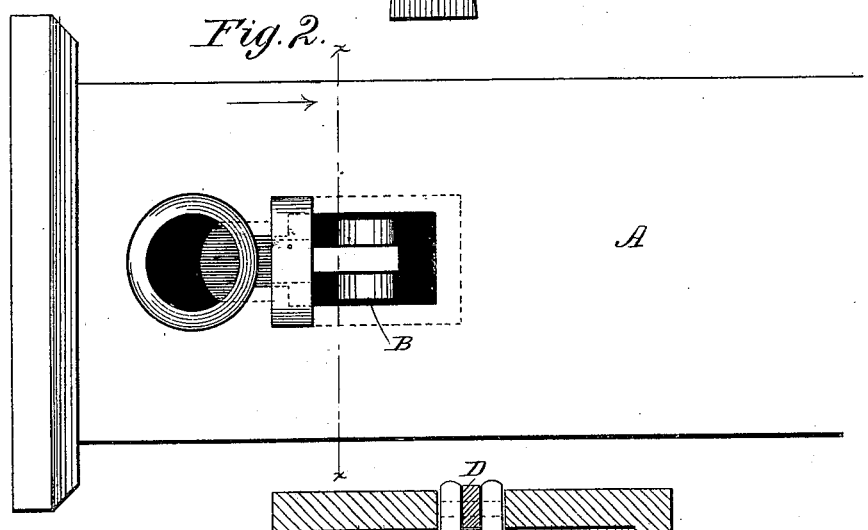
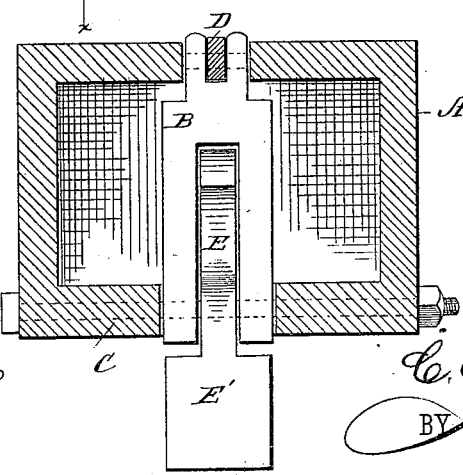
WITNESSES:
W. W. Hollingsworth
Edw. W. Byrn
INVENTOR:
C. E. Macarthy
BY
ATTORNEYS.

UNITED STATES PATENT OFFICE.

CHARLES E. MACARTHY, OF FORSYTH, GEORGIA.

CAR-COUPLING.

SPECIFICATION forming part of Letters Patent No. 263,549, dated August 29, 1882.

Application filed May 4, 1882. (No model.)

*To all whom it may concern:*

Be it known that I, CHARLES E. MACARTHY, of Forsyth, in the county of Monroe and State of Georgia, have invented a new and Improved Automatic Car-Coupling Attachment; and I do hereby declare that the following is a full, clear, and exact description of the same, reference being had to the accompanying drawings, forming part of this specification, in which—

Figure 1 is a vertical longitudinal section of the ordinary form of draw-bar provided with my attachment. Fig. 2 is a top or plan view; and Fig. 3 is a cross-section through the line $x \, x$, Fig. 2, looking in the direction of the arrow.

My invention relates to an improvement in automatic car-couplings, designed principally to hold the ordinary link in horizontal position favorable for automatic coupling.

In the patent granted me February 28, 1882, No. 254,347, I described a simple form of attachment to the ordinary draw-bars, which secured to them the advantages of automatic coupling. My present invention is designed to supply a means for holding the link in a horizontal position, which means shall be consistent with the form of coupling referred to in my said patent, so as to be used in connection therewith; and to this end my improvement consists in hanging in the bottom of the draw-bar, upon the same fulcrum with the vertical trigger-bar, a hook whose lower end hangs below the draw-bar and is weighted so as to normally hold the upper end of the hook back, but the upper end of which hook is bent or curved forward to a position substantially at right angles to a radial line extending from the fulcrum to the point of the hook, and which end of the hook may be brought forward and made to bear on the rear extremity of the link to hold it in horizontal position, and which hook, as soon as jarred loose by the shock of the cars coming together, falls back out of the way of the link, as hereinafter fully described.

In the drawings, A represents an ordinary form of draw-bar, such as is already in use.

B is the vertical trigger-bar, fulcrumed upon a pin, C, in the bottom of the draw-bar. This trigger-bar extends up through a slot cut in the top of the draw-bar, and there is jointed to a slide, D, that holds the pin up, which slide, however, is of a somewhat different construction from that shown in my said patent. The lower portion of the trigger-bar B is bifurcated or made in two sections, (see Fig. 3,) and between them, on the same fulcrum-pin C, is hung a hook, E, which curves forward at its upper end in the draw-bar and below the draw-bar has a weighted end, E', which, when set for holding the link, projects to the rear on the opposite side of its fulcrum from the hook, which, in swinging to its natural position, throws the upper end of the hook into a recess in the solid back portion of the draw-bar, as shown. Now, for holding the ordinary form of link horizontal in the ordinary form of draw-bar, a cleat, $a$, is put at the bottom of the mouth of the draw-bar as a bearing for the link, and then by pushing the weighted end E' of the hook back the hook is brought forward to a position over the rear end of the link, and as the portion of the link outside of the cleat $a$ is heavier than the other portion the pressure of the link up against hook E holds the hook in the position shown in dotted lines by frictional contact, and the hook reciprocally holds the link horizontal until the link has entered the other draw-bar, at which time the shock allows the weight E' to swing forward and the hook to pass back and remain in the recess out of the way. The peculiar construction of the hook, upon which I rely for this automatic action, is to be found in bringing the upper end of the hook forward in a curve or angle until the inside face of the hook at the end of the hook is substantially at right angles to a radial line drawn from this point of the hook to the fulcrum, by which construction the tilting pull of the link on the hook is made to exert a strain substantially at right angles to the bearing-face of the hook and in a line nearly radial to the center C, so that the link and hook are sufficiently engaged with frictional contact as to maintain their set positions until the time of impact of the cars.

Instead of pivoting the hook E on the fulcrum-pin C, said hook may have an elongated slot in it and be simply hung upon said pin, in which case the hook drops down from the shock.

The slide D, which holds up the pin, rests for the most part in the plane of the upper portion of the draw-bar, and it has a tongue, b, which is flat against the underneath side of the top of the draw-bar, and holds up the pin, while above the draw-bar or on its top side there is attached to the slide D a cross-cleat, D', (see Fig. 2,) which is wider than the slot on the draw-bar, and which sustains and guides the slide in its movement. The trigger-bar B is held forward so as to cause the slide to sustain the pin by its gravity—i. e., the back line, c c, of the recess is such that the trigger-bar can never quite assume a vertical position, but naturally tilts forward.

To prevent snow and ice from passing into the draw-bar from the slot above the slide, cleat D' has a rear extension, D², which is in the nature of a flat plate that covers said slot, as shown in Fig. 1 and by dotted lines in Fig. 2.

Having thus described my invention, what I claim as new is—

1. The combination, with the draw-bar, of a hook hung on a support in the bottom of the draw-bar, and having its upper end extended forward till the bearing-face for the link at the point of the hook is substantially at right angle to the radial line from the center of suspension, and having also below its center of suspension a weight disposed with respect to the upper end as shown and described, whereby the link and hook are made to reciprocally maintain their set position till the time of impact, at which time the hook automatically passes back and out of the way of the link from the influence of the weight, as described.

2. The combination, with the draw-bar and the bifurcated trigger-bar B, fulcrumed upon a pin in the bottom of the draw-bar, of the weighted hook E, having its upper end curved forward to a point at right angle to the radial line, the said hook being hung upon the same pin with and between the branches of the trigger-bar, and arranged to hold the link horizontal, as described.

3. The combination, with the pin, the slotted draw-bar, and the trigger-bar B, of the slide D, jointed to trigger-bar B and arranged in the plane of the top wall of the draw-bar, and formed with a tongue, b, inside the draw-bar, and a supporting cleat and shield above the draw-bar, substantially as described.

CHAS. E. MACARTHY.

Witnesses:
MURRAY HANSON,
LOUIS A. STIMIS.